United States Patent [19]

Schmidt

[11] Patent Number: 5,000,608
[45] Date of Patent: Mar. 19, 1991

[54] ADJUSTABLE MECHANISM

[76] Inventor: Theodore E. Schmidt, 8030 NW. Meadow Lake Rd., Carlton, Oreg. 97111

[21] Appl. No.: 446,059

[22] Filed: Dec. 5, 1989

[51] Int. Cl.⁵ .......................... F16C 11/00; F16D 1/12
[52] U.S. Cl. ...................................... 403/92; 403/103; 403/104; 403/110; 403/344; 403/367; 403/374; 248/284; 248/412
[58] Field of Search .................... 403/83-84, 403/92, 103-104, 344, 366, 367, 110, 373, 374; 248/411, 413, 106, 412, 188.5, 274, 284

[56] References Cited

U.S. PATENT DOCUMENTS

| | | | |
|---|---|---|---|
| 613,766 | 11/1898 | Hodgkinson | 403/350 X |
| 2,766,648 | 10/1956 | Jazwieck | 81/58 |
| 2,817,548 | 12/1957 | Uthemann | 403/104 |
| 3,856,421 | 12/1974 | Nogler | 403/118 |
| 3,867,049 | 2/1975 | Rice, Jr. | 403/344 |
| 4,111,575 | 9/1978 | Hoshino | 403/104 |
| 4,141,272 | 2/1979 | Yanagisawa | 403/92 X |
| 4,152,810 | 5/1979 | Martinez | 403/92 |
| 4,159,093 | 6/1979 | Hamilton | 248/284 |
| 4,363,561 | 12/1982 | Hsieh | 403/92 |
| 4,430,017 | 2/1984 | Stefancich | 403/104 |
| 4,469,289 | 9/1984 | Gebo | 403/104 X |
| 4,497,092 | 2/1985 | Hoshino | 403/104 X |
| 4,528,768 | 7/1985 | Anderson | 403/104 X |
| 4,744,690 | 5/1988 | Hsieh | 403/104 |
| 4,761,092 | 8/1988 | Nakatani | 403/104 |

Primary Examiner—Andrew V. Kundrat
Assistant Examiner—Franco S. De Liguori
Attorney, Agent, or Firm—Kolisch, Hartwell, Dickinson, McCormack & Heuser

[57] ABSTRACT

An adjustable mechanism including a journal portion and a non-continuous ring member that encircles the journal portion. The ring member has relatively displaceable end parts. A lever member extending in a plane normal to the axis of the journal portion is mounted through a pin on one end part and through another pin on the other end part and the lever member is swingable relative to the ring member to leverage the parts in either of opposite directions. An adjustably positioned member is provided to produce adjustably controlled displacement of the end parts of the ring member.

6 Claims, 2 Drawing Sheets

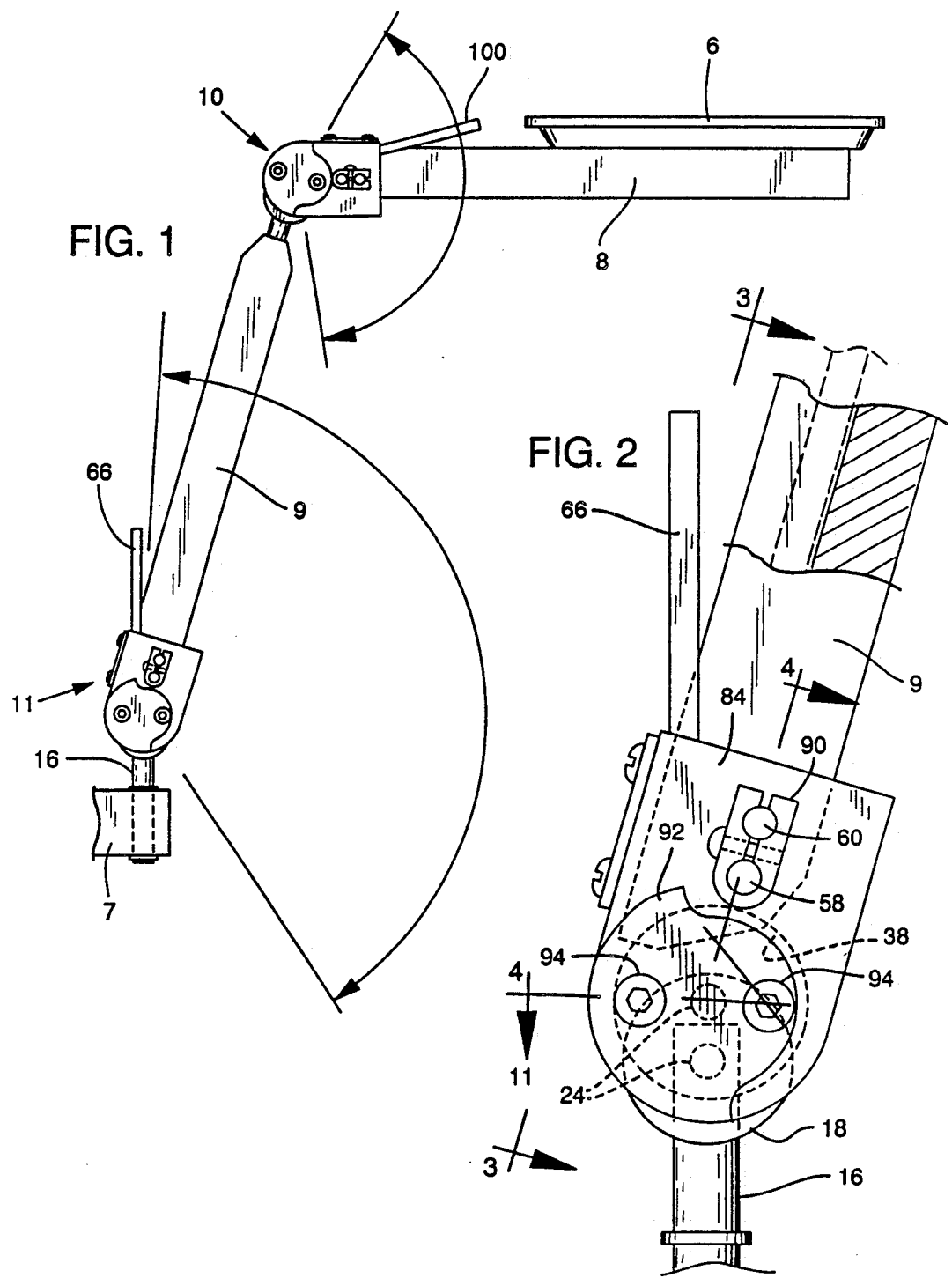

ADJUSTABLE MECHANISM

BACKGROUND AND SUMMARY OF INVENTION

This invention relates to an adjustable mechanism featuring a non-continuous ring member which encircles a circular journal portion, end parts in the ring member being displaceable either to tighten or to loosen the ring member with respect to the journal portion it encircles. With the ring member loosened, it is rotatable relative to the journal portion, and with the member tightened, it becomes frictionally secured to the journal portion.

In the particular embodiment of the invention herein specifically disclosed, the adjustable mechanism provides a mounting for a support arm, with the support arm providing support for such an instrumentality as a reading lamp, a work table, electronic instrumentation, etc. However, by specifically illustrating and describing the mechanism in conjunction with a support arm, it is not intended to so limit the invention, as the mechanism has useful applicability where it is desired controllably to release and lock one member with respect to another.

An object of the invention, therefore, is to provide a novel adjustable mechanism which includes a non-continuous ring member encircling a journal portion, the ring member being adjustably positionable with respect to the journal portion on relative displacement of ends in the ring member.

More specifically, the invention contemplates such a mechanism which includes a lever member with portions mounted on respective end parts of the ring member. The lever member is swingable in one direction to produce tightening of the ring member and in the opposite direction to produce loosening. The mechanism further includes adjustable means interposed between these end parts adjustable to permit the lever to move in a tightening direction without producing the normally expected tightening.

These and other objects and advantages are attained by the invention, which is described hereinbelow in conjunction with the accompanied drawings, wherein:

FIG. 1 is a side elevation of an embodiment of the invention;

FIG. 2 is a view, somewhat enlarged, of the bottom portion of the mechanism shown in FIG. 1;

Figure 3:
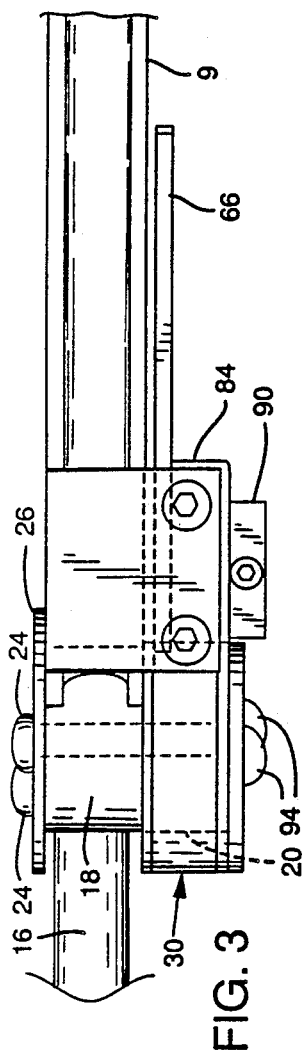
FIG. 3 is a view taken generally along the line 3—3 in FIG. 2.
Figure 4:
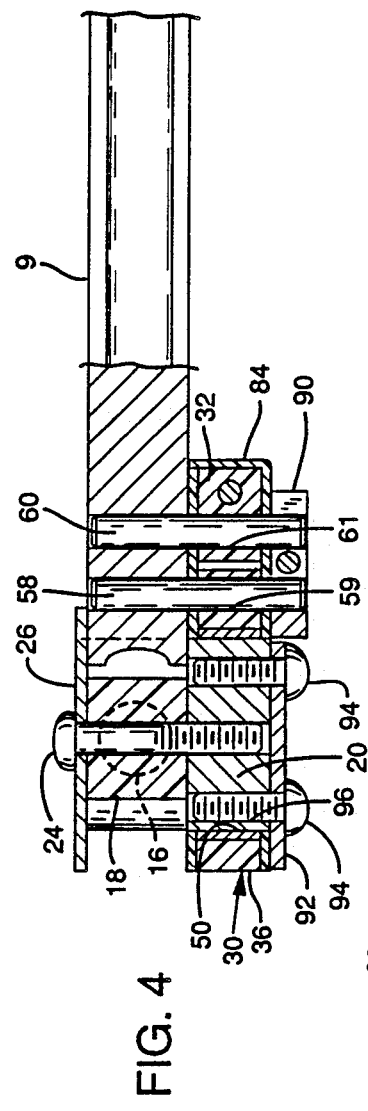
FIG. 4 is a cross-sectional view, taken generally along the line 4—4 in FIG. 2.
Figure 6:
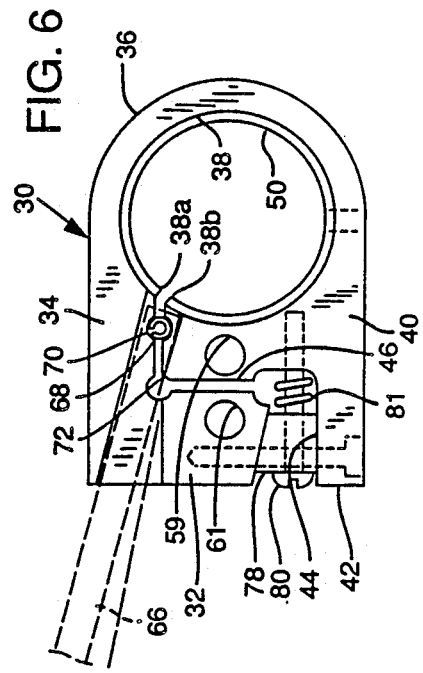
FIGS. 5 and 6 illustrate opposite sides of a ring member in the mechanism illustrated, together with portions of other structure.

Referring to the drawings and particularly to FIG. 1, a table 6, such as might be used to support a video screen, a keyboard, a lamp, or any number of other devices, is shown adjustably supported on a frame member 7 through a pair of support arms shown at 8 and 9. Adjustable mechanism 10 interconnects one end of support arm 8 with the upper end of support arm 9. A similar adjustable mechanism 11 connects the lower end of support arm 9 with frame member 7. Mechanisms 10 and as will hereinafter be described, permit table 6 to be placed at different elevations and at different inclines relative to the frame member 7.

Adjustable mechanism 11 includes a post 16 supported in a substantially upright position in frame member 7. Normally the post is rotatably supported in its upright position with the post rotatable about its longitudinal axis. This enables the support arms and any table they support to be swung to different positions about this upright axis.

The upper end of post 16 seats within an accommodating bore provided in circular pad element 18. Located to one side of the pad element is circular journal portion 20 bounded by a cylindrical surface. Fasteners 24 secure the upper end of post 16 in its seated position within pad element 18, and secure the pad element to the journal portion located to one side of the element. A cover member 26 extends over one side of pad element 18, and fasteners 24 also secure this cover member in place.

Given the reference numeral 30 is what is referred to herein as a non-continuous ring member. Such ordinarily may be constructed of a metal having a limited degree of resilient flexibility, such as aluminum, although other materials may be employed. The ring member includes a block portion 32 integral with a leg portion 34, these portion collectively forming one end of the ring member. Leg portion joins with a band portion 36 bounded by a non-continuous cylindrical surface 38 which starts at 38a and ends at 38b. A block portion 40 integral with the band portion and an arm portion 42 integral with the block portion 40 form the opposite end of the ring member 30.

A cavity 44 with tapered wall surfaces is interposed between arm portion 42 and the base of block portion 32. An "L" shaped slit 46 separates block and leg portion 32, 34, i.e., one end of the ring member, from block portion 40, i.e., the opposite end of the ring member.

Suitably mounted and secured within the interior of the ring member and extending over surface 38 is a bronze bushing 50. The bushing is also non-continuous, i.e., split, to leave an opening adjacent regions 38a, 38b of surface 38.

In the adjustable mount, member 30 is mounted with bushing 50 snugly encompassing the surface of journal portion 20.

Figure 5:
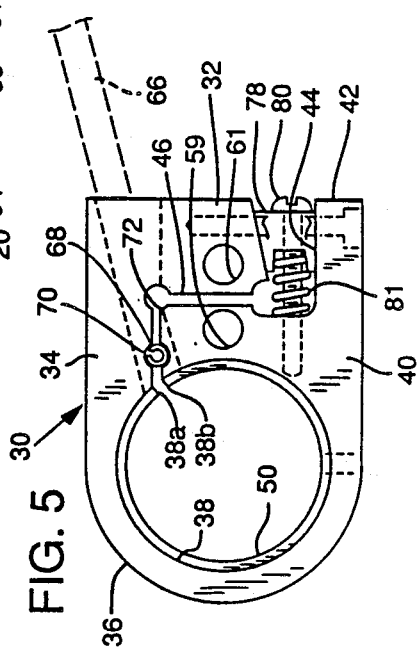

Support arm 9, also referred to as a lever member, is supported on ring member 30 with the arm extending outwardly to one side of the journal portion and lying in a plane which is generally normal to the rotational axis of the journal portion. One end of the lever member is secured by a pin 58 extending through bore 59 to one of the end parts of member 30, and by a pin 60 extending through bore 61 to block portion 32 of the other end part of the ring member. With the mounting described, and on lever member 9 swung clockwise in FIG. 2, this relatively displaces (and now referring to FIG. 5) block portion 32 downwardly with respect to block portion 40. This causes surface 38 and bushing 50 to constrict about the journal portion with the ring member then becoming frictionally locked to the journal portion. With the parts as shown in FIG. 1, gravity operating on the arm 9 induces such clockwise swinging of the arm and frictional engagement of the journal portion. If the arm, however, is lifted to swing it in a counterclockwise direction, displacement of block portions 40, 32 with respect to each other is in the opposite direction, with resulting loosening of the bushing about the journal portion whereby the ring member moves freely.

This invention further contemplates an adjustable mechanism interposed between the end parts of the ring member, adjustable to effect controlled displacement of the end parts in the ring member in a displacing direction producing loosening.

Specifically, a release lever is indicated at 66 extending outwardly from the ring member alongside lever member 9. A pin 68 extending laterally of lever 66 seats in bore 70 provided between the end parts of the ring member. The pin and bore provide a pivot mounting for the release lever. The lever extends over an abutment 72 spaced a distance from pin 68. With the release lever swung clockwise or downwardly in FIG. 5, this tends to displace block portion 40 downwardly with respect to block portion 32 producing release of the ring member.

Additionally, there is shown a wedge member 78 seating within cavity 44. An adjustment screw 80 extending though the wedge member is turned to advance or retract the wedge member within the cavity. A spring 81 encircling screw 80 biases the wedge member outwardly. The wedge member may be positioned, for instance, in a position which prevents displacement of block portion 40 downwardly with respect to block portion 32 beyond a certain limit position. This position might be one wherein, with lever 66 swung downwardly or clockwise in FIG. 2, the journal portion 20 would be frictionally grabbed, but not with such a force as to completely prevent movement of the ring member about the journal portion. With the wedge member shifted outwardly from this position, a greater force is required in the lever member to produce relative rotation. Adjustment of the wedge member inwardly produces an opposite result.

A removable cover 84 is mounted in place with pins 58, 60 extending through suitable bores in this cavity. A retainer 90 secured to the ends of pins 58, 60 holds the cover in place.

A stop plate is shown at 92 which may be secured in place on a journal portion with fasteners 94 engaging internally threaded bores 96. The stop plate includes opposed shoulders engageable with the end of retainer 90 to define limit positions. Various configurations of stop plate may be utilized depending upon the particular application of the mounting.

Adjustable mechanism 10 may have a construction similar to the construction of mechanism 11 just described. Support arm 8 is connected to different end parts of a discontinuous ring member, in the same manner as support arm 9. Release lever 100, like release lever 66, constitutes an adjustable mechanism adjustable to effect controlled displacement of the end parts entering member of unit 10 in a direction producing loosening.

It should be obvious from what has been described that a highly versatile mounting is provided. A member, such as each of the support arms described, is readily swung in one direction, but prevented from movement in the opposite direction, by frictionally engaging the journal portion 20. The frictional engagement with this journal portion is controlled, either through operation of the release lever, or by proper positioning of the wedge member. The release lever provides for quick release, whereas the wedge member is used to produce an adjustment lasting over a period of time.

While an embodiment of invention has been described, obviously variations and modifications are possible.

It is claimed and desired to secure by Letters Patent:

1. An adjustable mechanism comprising:
a circular journal portion having a rotational axis,
a non-continuous ring member encircling the journal portion, said ring member having adjacent relatively displaceable end parts, the end parts on relative displacement in one direction producing tightening of the ring member on the journal portion and on relative displacement in a direction opposite said one direction producing loosening of the ring member,
a first lever member extending in a plane normal to the rotational axis of the journal portion, said lever member having a first layer member portion and a second lever member portion, a first pin mounting said first lever member portion on one of said end parts and a second pin mounting the second lever member portion on the other of said end parts, said lever member being swingable relative to the ring member to leverage the parts in either said one or said opposite directions, and
adjustable means interposed between the end parts of said ring member for producing adjustably controlled displacement of said parts in said opposite direction causing loosening of said ring member, said adjustable means comprising a second lever member, said second lever member being mounted on the ring member and being swingable relative to the ring member to displace said parts in said opposite direction producing loosening of the ring member.

2. The mechanism of claim 1, wherein said second lever member is an elongate member disposed alongside but spaced from the first lever member and the second lever member swings toward the first lever member to produce relative displacement of said parts in said opposite direction.

3. The mechanism of claim 1, wherein said adjustable means further comprises a screw-adjusted wedge member interposed between said parts.

4. The mechanism of claim 1, wherein said adjustable means includes an adjustably positioned member which is adjustable to change the extent said parts are relatively displaceable in said one direction.

5. An adjustable mechanism comprising:
a post and means supporting the post in an upright position,
a circular journal portion having a rotational axis mounted on the post with the rotational axis of the journal portion extending transversely of the post,
a non-continuous ring member encircling the journal portion, said ring member having adjacent relatively displaceable end parts, the end parts on relative displacement in one direction producing tightening of the ring member on said journal portion and on relative displacement in a direction opposite said one direction producing loosening of the ring member,
a support arm and a first pin adjacent one end of the support arm mounting the support arm on one of said end parts and another pin spaced from the first pin adjacent said one end of the support arm mounting the support member on the other of said end parts, said support arm extending in a plane normal to the rotational axis of displace said end parts in said one direction to produce tightening of the ring member, and
adjustable means interposed between the end parts of the ring member for providing adjustable controlled displacement of said end parts in said opposite direction causing loosening of the ring member, the journal portion and outwardly to one side of said post and under gravity said support arm swings to said adjustable means comprising a lever member swingable to leverage said end parts and to produce displacement of said end parts in said opposite direction.

6. The mechanism of claim 5, wherein said lever member is an elongate member connected to said ring member and extending outwardly from the ring member alongside but spaced from the support arm, movement of the lever member toward the support arm being operable to produce displacement of said end parts in said opposite direction.

* * * * *